United States Patent [19]

Acre et al.

[11] 4,116,218

[45] Sep. 26, 1978

[54] SEQUENTIAL VALVE FOR POWER BRAKE UNIT

[75] Inventors: Sydney R. Acre, Elsie; Marquis J. Lake, Sr., Corunna, both of Mich.

[73] Assignee: Midland-Ross Corporation, Cleveland, Ohio

[21] Appl. No.: 640,902

[22] Filed: Dec. 15, 1975

[51] Int. Cl.² ............................................. F16K 11/16
[52] U.S. Cl. .................................... 137/627.5; 91/19; 91/32; 91/376 R
[58] Field of Search ...................... 91/6, 19, 32, 376 R, 91/422, 437; 60/404; 137/625.11, 627.5

[56] References Cited

U.S. PATENT DOCUMENTS

| | | | |
|---|---|---|---|
| 3,174,285 | 3/1965 | Stelzer | 92/84 |
| 3,434,388 | 3/1969 | Julow | 91/6 |
| 3,661,054 | 5/1972 | Brown | 91/376 |
| 3,678,959 | 7/1972 | Liposky | 137/625.11 |
| 3,719,044 | 3/1973 | Bach | 60/404 |
| 3,780,620 | 12/1973 | Gardner | 91/6 |
| 3,921,501 | 11/1975 | Rosback | 91/32 |
| 3,937,126 | 2/1976 | Grabb | 91/6 |

Primary Examiner—Martin P. Schwadron
Assistant Examiner—Abraham Hershkovitz
Attorney, Agent, or Firm—H. Duane Switzer

[57] ABSTRACT

A sequential valve mechanism for power brake units moves in one direction for sequentially connecting a chamber to three different pressure sources, and moves in an opposite direction for sequentially connecting the chamber to the different pressure sources in reverse order.

4 Claims, 1 Drawing Figure

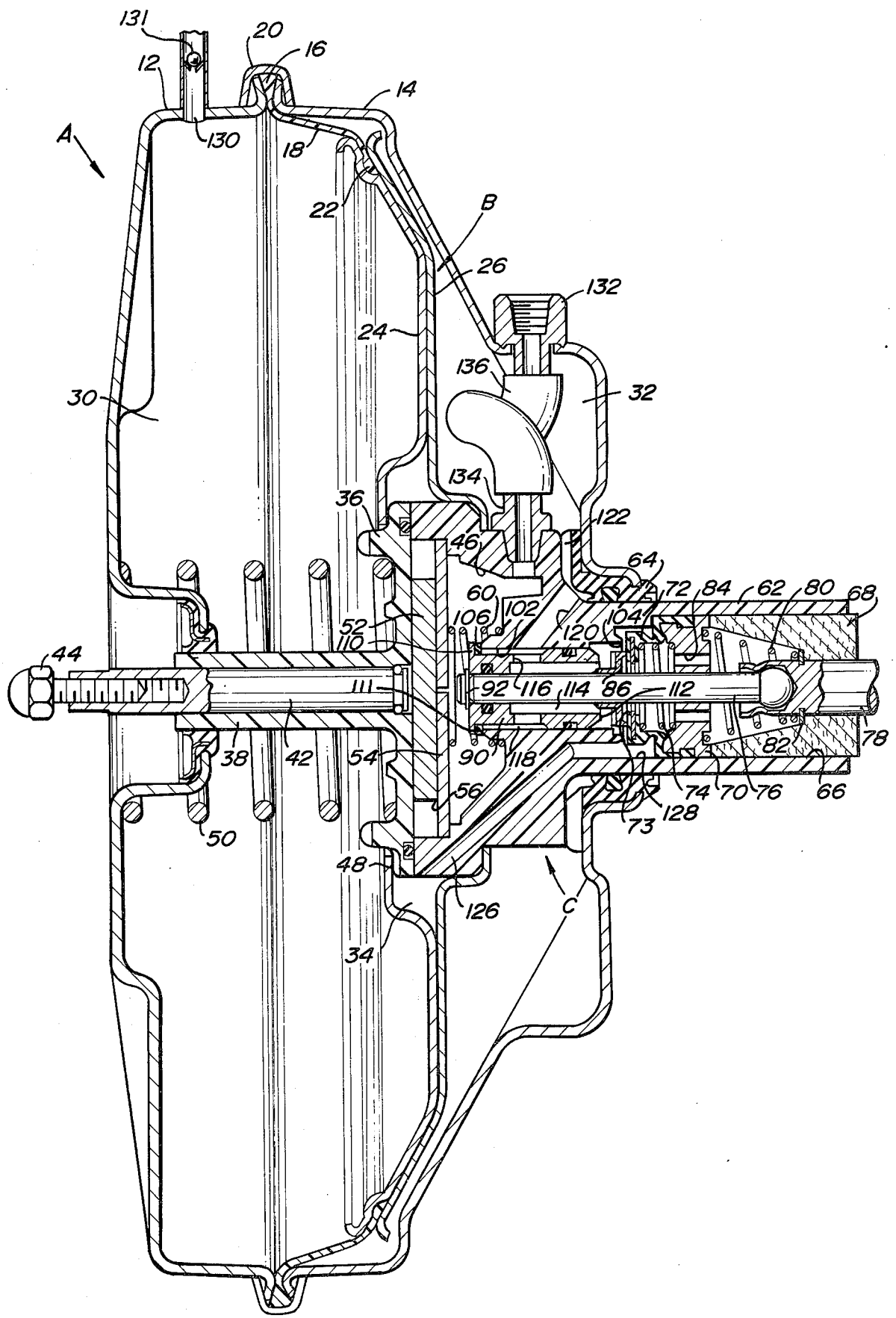

SEQUENTIAL VALVE FOR POWER BRAKE UNIT

BACKGROUND OF THE INVENTION

This application pertains to the art of valves and, more particularly, to sequential valves which sequentially close and open ports for connecting a chamber to different pressure sources. The invention is particularly applicable to power brake units and will be described with reference thereto. However, it will be appreciated that the invention has broader aspects and may be used for devices other than power brake units.

One well-known type of power brake unit is commonly referred to as a vacuum power brake unit, and comprises a housing enclosing front and rear chambers on opposite sides of a movable wall. The front chamber is connected with the engine vacuum and communicates with the rear chamber through a valve mounted on the movable wall which is normally biased to a rest position by a spring. Operation of the brake pedal moves the valve to close communication between the chambers and opens the rear chamber to atmospheric pressure which causes movement of the movable wall due to the pressure differential in the two chambers. The movable wall carries a push rod which acts on a hydraulic cylinder for operating wheel brake cylinders.

In vacuum brake units of the type described, adequate force can be obtained if the vacuum in the front chamber is sufficiently below atmospheric pressure, and if the area of the movable wall is sufficient to obtain the desirable force due to the pressure differential in the two chambers. However, due to factors such as safety and environmental regulations, modern automobiles must have decreased stopping distances, and also result in automobiles having reduced engine vacuum levels, reduction in underhood packaging space and increased curb weight. These factors require an increase in the energy available in power brake units, while decreasing the overall size. Supercharging a vacuum power brake unit with positive air pressure is one answer to the problems.

U.S. Pat. No. 3,780,620 issued Dec. 25, 1973, to Gardner discloses one arrangement of a supercharged vacuum power brake unit. In the Gardner unit, the rear chamber is sequentially connected to vacuum, atmospheric pressure and then superatmospheric pressure. However, releasing the brake pedal connects the rear chamber directly from superatmospheric pressure to front chamber vacuum so that all of the braking force is lost. In situations where it appears desirable to have an initial high braking force and then a reduced braking force, the Gardner unit cannot operate to connect the rear chamber from superatmospheric pressure to atmospheric pressure. Instead, the Gardner unit operates to connect the rear chamber directly from superatmospheric pressure to front chamber vacuum so that all of the braking force would be lost momentarily and the brake pedal would have to be reapplied for connecting the rear chamber from atmosphere to superatmospheric pressure. The front vacuum chamber is connected with the engine intake manifold through a check valve so that the vacuum chamber captures the highest vacuum level produced by the engine and holds this level in the engine off mode so that booster output capacity is maintained on a degrading basis. In the Gardner unit, the output capacity of the booster would be zero when the front chamber is connected directly to the superatmospheric pressure in the rear chamber. It would be desirable to have a unit which would sequentially connect the rear chamber with superatmospheric pressure, atmospheric pressure and then vacuum.

The Gardner unit also requires four valves, and opening or closing movement of certain valves is not directly related to closing or opening movement of adjacent valves. This arrangement requires extremely close tolerance in order to insure substantially simultaneous opening of a next valve with closing of a previous valve. Tolerances of this nature are virtually impossible to maintain, and results in a unit having a certain amount of slack. That is, the unit must be designed so that the brake pedal will travel a short distance after closing of one valve before the next valve is opened. This is an undesirable arrangement because it does not provide smooth operation.

The Gardner unit also requires a separate passage in the valve body for communicating superatmospheric pressure with the rear chamber, while vacuum and atmospheric pressure communicate with the rear chamber through a different valve bore. It would be desirable to have all of the pressure sources communicate with the rear chamber through a common bore in order to simplify the valve body.

SUMMARY OF THE INVENTION

A power brake unit has a valve mechanism movable in one direction for sequentially connecting the rear chamber with three different pressures, and movable in an opposite direction for sequentially connecting the rear chamber with the different pressures in reverse order. With this arrangement, the rear chamber can be connected directly from superatmospheric pressure to atmospheric pressure for slightly reducing the braking force.

The improved valve mechanism of the present application includes three movable valve members which cooperate with one another for sequentially connecting the rear chamber to the different pressures. An intermediate movable valve member is located between opposite end valve members, and is opened when spaced intermediate the end valve members. The intermediate valve member is closed when engaged with either of the end valve members. Opening movement of the end valve members takes place by force applied thereto directly through the intermediate valve member. Such an arrangement does not require close tolerances because closing movement of the intermediate valve member results directly in opening movement of either of the end valve members so that opening of a next valve member occurs substantially simultaneously with closing of the previous valve member. This arrangement provides reduced hysterisis and excellent modulating characteristics.

In a preferred arrangement, the three movable valve members are located substantially coaxial with a valve operating rod. The valve mechanism includes a valve body having a bore with opposite bore ends, and a passage located intermediate the bore ends connect the bore with the rear chamber. Vacuum and atmospheric pressure communicate with the bore through one bore end, while superatmospheric pressure communicates with the bore through the other bore end. Vacuum and atmospheric pressure communicate with the rear chamber through the superatmospheric valve member.

It is a principal object of the present invention to provide an improved supercharged vacuum power brake unit.

It is a further object of the invention to provide a supercharged power brake unit which does not require close tolerances to insure substantially simultaneous closing and opening of sequential valves for achieving smooth operation.

It is another object of the invention to provide a supercharged power brake unit having a chamber which is sequentially connected to three different pressures when the unit is energized, and is sequentially connected to the three different pressures in reverse order when the brake pedal is released.

It is an additional object of the invention to provide a supercharged power brake unit having only three movable valve members which cooperate with one another for achieving sequential operation of the unit.

BRIEF DESCRIPTION OF THE DRAWING

The drawing shows a cross-sectional elevational view of a supercharged vacuum power brake unit constructed in accordance with the present invention.

DESCRIPTION OF A PREFERRED EMBODIMENT

With reference to the drawing, a supercharged vacuum power brake unit includes a housing A of two parts 12 and 14 sealed together against an outer annular bead 16 of a flexible diaphragm 18 by a clamping ring 20. Diaphragm 18 has an inner annular head 22 secured between welded together parts 24 and 26 of a movable wall B which divides housing A into front and rear chambers 30 and 32. Chambers 30 and 32 may also be identified as first and second chambers, or as a vacuum supply chamber and a modulated chamber.

The radially inner portions of parts 24 and 26 on movable wall B carry a hub or valve body C, and are deformed outwardly from one another to define an annular cavity 34. A separate front part 36 on valve body C has an elongated extension 38 slidably extending through seal 40 in housing part 12 and carrying a push rod 42 having an adjustable torque bolt 44 for adjusting the length thereof, and which acts against the piston of a hydraulic cylinder for operating wheel brake cylinders. Part 36 also seals a valve body cavity 46 and has suitable passages, one of which is diagrammatically illustrated at 48, for establishing communication between the vacuum supply chamber 30 and annular cavity 34. A spring 50 acts between part 12 of housing A and valve body C for normally biasing movable wall B and valve body C to a rest or passive position as shown in the drawing. Valve cavity 46 has a bridge member 52 and a pair of rectangular reaction levers 54 which pivot about bridge member edges 56 during operation of the power unit so that the inner ends of the levers move to the right in the drawing for providing feedback forces to the brake pedal in a manner more fully described in U.S. Pat. No. 3,628,422 issued Dec. 21, 1971 to Acre. A relatively light spring 60 acts between valve body C and levers 54 for holding same in the position shown in the drawing when the power unit is not operating.

Valve body C has a cylindrical rear extension 62 slidably extending through seal 64 on housing part 14. Inner bore 66 is open to atmosphere through a filter 68. A plug member 70 is press fit or otherwise secured within bore 66 against movement relative thereto and supports a movable first or end valve member 72 of rubber or other flexible material having a bellows-like portion for extending and retracting movement thereof relative to plug 70. A coil spring 74 acts between plug member 70 and valve 72 for biasing same to the left in the drawing. An enlarged central opening 73 is provided in valve member 72.

A valve operating means in the form of an operating rod 76 is slidably guided through plug member 70 and is suitably secured to a rod 78 which is connected to the brake pedal. A coil spring 80 acts between plug member 70 and a C-ring 82 on rod 78 for normally biasing rods 76 and 78 to the right in the drawing. Plug member 70 has suitable holes 84 therethrough for passage of atmospheric pressure. A second or intermediate movable valve member 86 is press fit or welded to rod 76 against movement relative thereto. A third or other movable end valve member 90 is positioned on rod 76 for relative movement between rod 76 and valve member 86. A C-ring 92 on the end of rod 76 retains valve member 90 thereon.

Valve body C includes a central cylindrical bore 102 having opposite bore ends 104 and 106 which also define valve seats. Valve member 90 has suitable seals between rod 76 and bore 102, and has a flange 110 at one end thereof and a valve seat 112 at the other end thereof. A suitable gasket 111 is positioned between seat 106 and flange 110. Valve 90 is hollow as at 114 and has radial passages 116 communicating with an external circumferential groove 118. A passage 120 extending through valve body C communicates with bore 102 intermediate the opposite bore ends thereof, and also communicates with one or more passages as at 122 between valve body C and part 14 of housing A. A passage 126 in valve body C communicates with annular cavity 34 and an enlarged circumferential bore 128 surrounding valve member 72.

Housing A has a suitable port 130 connected to the engine intake manifold through a check valve 131 for creating a vacuum or subatmospheric pressure in chamber 30. Suitable fittings 132 and 134 are mounted on housing A and valve body C, and are connected by a slack flexible hose 136. Fitting 134 communicates with valve cavity 46, while fitting 132 is connected to an air pump or the like which supplies superatmospheric pressure to valve cavity 46. The purpose of check valve 131, which is shown diagrammatically for simplicity of illustration, is to allow front chamber 30 to capture and hold the highest vacuum level produced by the engine. Check valve 131 allows chamber 30 to hold the highest vacuum level it has captured even after the engine is off so that booster output capacity is maintained on a degrading basis.

When the power unit is not operating, the parts are normally positioned as shown in the drawing. Chambers 30 and 32 on opposite sides of movable wall B are in communication with one another through passage 48, annular cavity 34, passage 126, bore 128, past valve 72 and valve seat 104, through hollow portion 114 of valve 90, and through passages 120 and 122.

When force is applied to the brake pedal, rods 76 and 78 move to the left until spring 74 moves valve 72 against seat 104 to block communication between chamber 30 and 32. Pressure in valve cavity 46 acting on the end of valve 90 keeps flange 110 thereof seated against seat 106 so that rod 76 simply moves relative to valve 90. If desired, an additional coil spring can be positioned between levers 54 and valve member 90 for maintaining same seated and for returning same to its seated position.

Further movement of rod 76 will cause valve 86 to move away from valve 72 for supplying chamber 32 with atmospheric pressure through bore 66, openings 84 in plug member 70, hole 73 in valve member 72, past the outer periphery of valve 86, and then through valve member 90 and passages 120 and 122. The differential pressure in chambers 30 and 32 will then cause movable wall B to move toward the left so that push rod 42 will operate the hydraulic cylinder for operating the wheel brake cylinders.

If additional braking force is required, further movement of the brake pedal will move rod 76 until valve 86 seats against seat 112 on valve 90. This will close chamber 32 to communication with atmospheric pressure. Further movement of push rod 76 will then cause valve 90 to move to the left so that flange 110 moves away from seat 106 and superatmospheric pressure in cavity 46 acts past valve seat 106, bore 102, and passages 120 and 122 into chamber 32. The higher differential pressure between chambers 30 and 32 will then move movable wall B to the left with greater force.

When less braking force is desired, the brake pedal is released somewhat so that rod 76 moves to the right. The friction between valve 90 and rod 76 is arranged so that valve member 90 moves with rod 76 to the right. In the alternative, the separate spring between levers 54 and valve member 90 will maintain valve member 90 in engagement with second valve member 86 during movement of rod 76 to the right. Once flange 110 on valve member 90 seats against seat 106, chamber 32 is closed against communication with superatmospheric pressure in cavity 46. Further movement of rod 76 to the right will displace valve 86 from seat 112 so that the superatmospheric pressure in chamber 32 is exhausted to atmosphere and chamber 32 will be reduced to atmospheric pressure for supplying a reduced braking force. Still further movement of rod 76 to the right will cause valve member 86 to seat against valve member 72 for blocking chamber 32 against communication with atmospheric pressure. Further movement of rod 76 to the right under the influence of spring 80 will displace valve 72 from seat 104 so that chamber 32 will again be under subatmospheric pressure and spring 50 will move movable wall B and valve body C back to the position shown in the drawing.

It will be recognized that second or intermediate valve member 86 has an intermediate spaced position between first and third end valve members 72 and 90 when chamber 32 is open to atmospheric pressure. Engagement of intermediate valve member 86 with either of the valve members 72 or 90 closes chamber 32 to communication with atmospheric pressure. Both end valve members 72 and 90 are moved in opening directions by force transmitted thereto directly through intermediate valve member 86. This insures that one valve will be closed before the next valve opens, although opening and closing are substantially simultaneous and tolerances are not critical.

Communication of all three different pressures is through bore 102 in valve body C. Subatmospheric and atmospheric pressures communicate with bore 102 past one end 104 thereof, while superatmospheric pressure communicates therewith past other end 106 thereof. All of valve members 72, 86 and 90 are positioned generally coaxially of reciprocable valve operating rod 76. Movement of rod 76 in one direction to the left operates the valve mechanism sequentially to first close valve member 72, open valve member 86, close valve member 86 and then open valve member 90. When valve rod 76 moves to the right, the valve mechanism operates sequentially to first close valve member 90, open valve member 86, close valve member 86 and then open valve member 72. Each valve member is movable between its open and closed positions in direct response respectively to closing and opening movement of an adjacent valve member.

The improved valve mechanism of the present application may be considered as having three inlets defined by a first inlet 104 which is selectively opened and closed by valve member 72; a second valve inlet defined by hole 73 in valve member 72 which is selectively opened and closed by valve member 86; and a third inlet defined by seat 106 which is selectively opened and closed by valve member 90.

It will be recognized that the improved valve mechanism of the present application moves in one direction for sequentially connecting the chamber 32 with three different pressure sources, and is movable in an opposite direction for sequentially connecting chamber 32 with the different pressure sources in reverse order. Such an arrangement provides very smooth operation of the power brake unit.

Although the invention has been shown and described with respect to a preferred embodiment, it is obvious that equivalent alterations and modifications will occur to others skilled in the art upon the reading and understanding of this specification. The present invention includes all such equivalent alternations and modifications, and is limited only by the scope of the claims.

We claim:

1. A valve mechanism including valve means having relatively movable cooperating valve member means and valve seat means, passage means in said valve means for connecting a chamber to three different pressure sources of three different magnitudes, operating means movable in one direction for operating said valve member means and valve seat means to sequentially connect the chamber to the three different pressure sources through said passage means in order of increasing magnitude while closing off each preceding pressure source substantially simultaneously with opening of each succeeding pressure source, said operating means being movable in an opposite direction for operating said valve member means and valve seat means to sequentially connect the chamber to the three different pressure sources through said passage means in reverse order of decreasing magnitude, said valve member means including, first, second and third movable valve members, said passage means including a passage through said third valve member, and communication with the chamber past said first and second valve members being through said passage in said third valve member.

2. A valve mechanism including valve means having relatively movable cooperating valve member means and valve seat means, passage means in said valve means for connecting a chamber to three different pressure sources of three different magnitudes, operating means movable in one direction for operating said valve member means and valve seat means to sequentially connect the chamber to the three different pressure sources through said passage means in order of increasing magnitude while closing off each preceding pressure source substantially simultaneously with opening of each succeeding pressure source, said operating means being movable in an opposite direction for operating said valve member means and valve seat means to sequentially connect the chamber to the three different pressure sources through said passage means in reverse order of decreasing magnitude, said valve member means including an intermediate valve member and a pair of opposite end valve members, said end valve members having passages therethrough, said intermediate valve member providing flow therepast through said passages in both said end valve members when positioned intermediate said end valve members, and said intermediate valve member closing each said passage in each said end valve member when engaged with each said end valve member.

3. A valve mechanism comprising; a valve body having first, second and third inlets, said mechanism including four different valve seats, said mechanism further including first, second and third movable valve members movable relative to said valve body and to one another for cooperation with said valve seats for respectively sequentially closing and opening said inlets so that each succeeding inlet opens when a previous one closes, operating means movable in one direction for sequentially moving said valve members for cooperating with said valve seats to sequentially close said first inlet, open said second inlet, close said second inlet, and open said third inlet, said operating means being movable in an opposite direction for cooperating with said valve seats and sequentially moving said valve members to sequentially close said third inlet, open said second inlet, close said second inlet, and open said first inlet, said second valve member being positioned between said first and third valve members, said second inlet being open when said second valve member is spaced intermediate said first and third valve members, and said second inlet being closed when said second valve member engages either said first or third valve member.

4. The valve mechanism of claim 3 wherein said first and third valve members are moved to open positions by force transmitted thereto directly through said second valve member.

* * * * *